June 18, 1935.  A. P. CHESTER ET AL  2,004,977
OVEN CONTROL
Filed Nov. 9, 1931  2 Sheets-Sheet 1
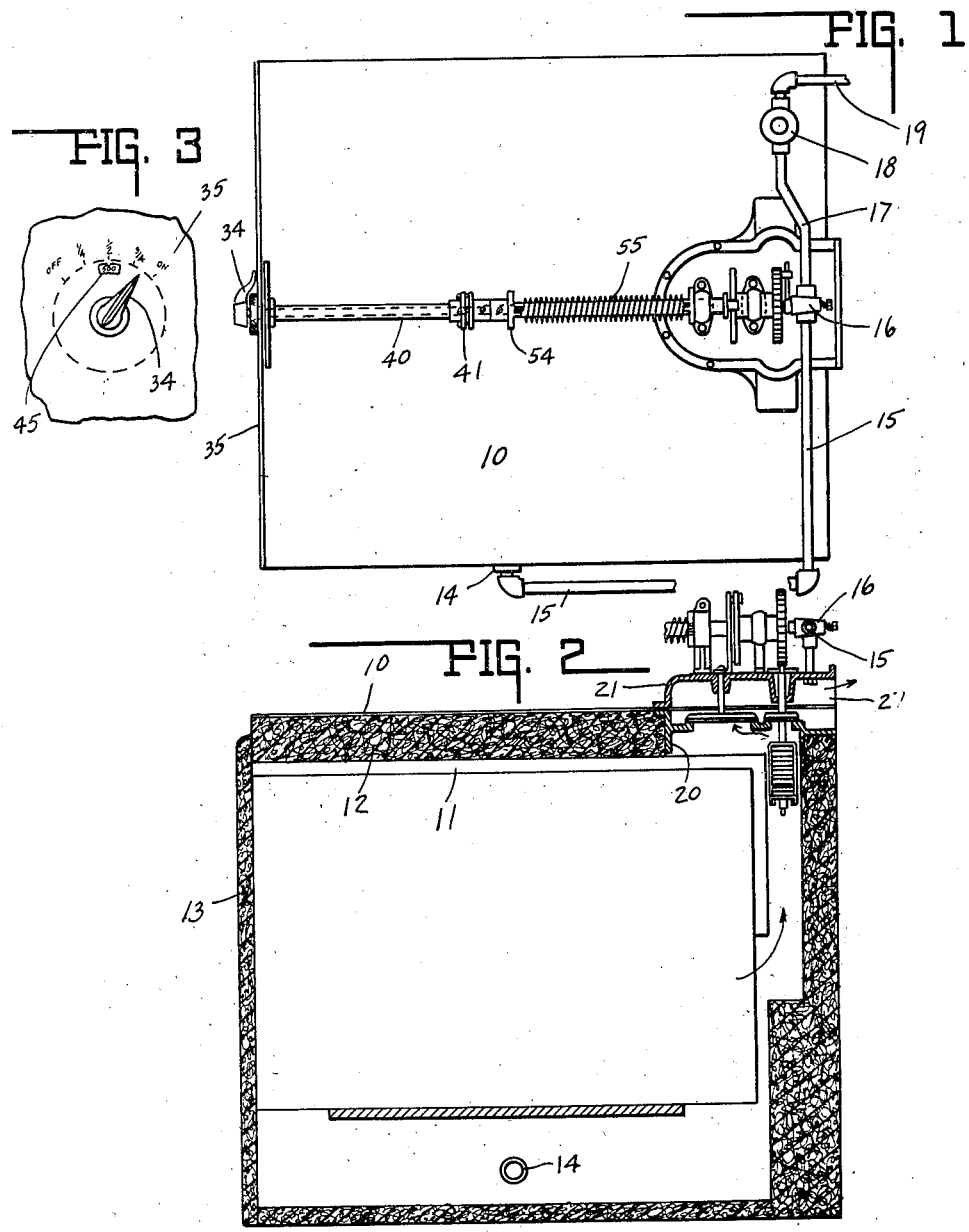
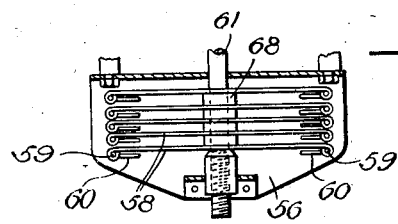
INVENTORS.
ALDEN P. CHESTER.
DEWEY H. HILL.
BY
Lockwood Lockwood Gillsmith & Galt
ATTORNEYS.

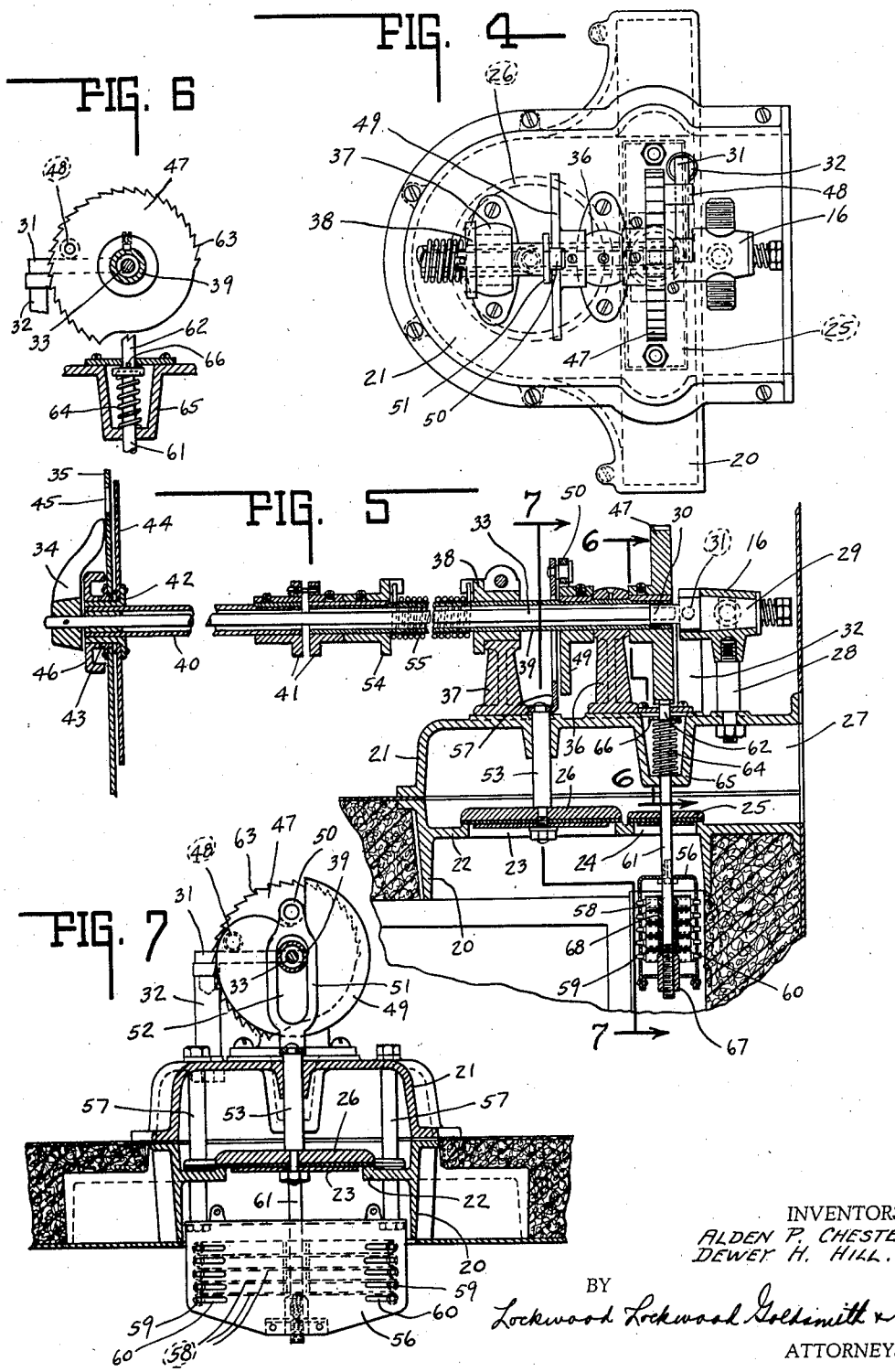

Patented June 18, 1935

2,004,977

UNITED STATES PATENT OFFICE 2,004,977

OVEN CONTROL

Alden P. Chester and Dewey H. Hill, Kokomo, Ind., assignors to Globe-American Corporation, Kokomo, Ind., a corporation Application November 9, 1931, Serial No. 573,748

4 Claims. (Cl. 126—39)

This invention relates to an oven control for a cook stove, and more particularly to the type of oven control in which the cooking time is divided into a heat supply period and a fireless cooking period. At the end of the heat supply period, the supply of fuel to the burners is shut off and the oven vents are closed to prevent circulation of air so that the oven is thereby converted into a fireless cooker. The cooking is completed during the fireless cooking period as the oven gradually cools. In this type of oven control, the degree of cooking depends upon two factors: first, the temperature of the oven at the time the heat is turned off, and, second, the length of time required to attain this temperature. For example, the food will be more thoroughly cooked if twenty minutes are required to reach the desired cut-off temperature than it will be if only ten minutes are required. This is true because ordinarily cooking takes place at any temperature above 212° F. and where a longer time is required to reach the cut-off temperature the food is kept above 212° F. for a longer time during the heat supply period.

Heretofore, in the operation of automatic mechanism for shutting off the fuel supply and closing the vents, two methods have been used to determine the time of operation of the mechanism: first, a thermostatic method, and, second, a time-controlled method. In the first method the heat supply period is automatically stopped when a predetermined temperature is reached in the oven irrespective of the time required to reach that temperature. In the second method the heat supply period is closed at a predetermined time after the start of cooking irrespective of the temperature of the oven at that time. In the use of natural or artificial gas for cooking, the pressure of gas supplied often varies from three to seven inches of water in a single day, depending on the rate of use, the weather, the supply on hand and other factors. Obviously, if the thermostatic method is used, the time of the heat supply period will be much longer if the gas pressure is low than if it is high. Similarly, if the time-controlled method is used, the temperature of the oven at the time of shut-off will be much less with low pressure gas than with high pressure gas. No uniformity of cooking results can, therefore, be secured merely by the setting of a thermostat or time clock so long as an appreciable variation in gas pressure is encountered. A pressure difference as small as one-half inch of water makes an immense difference in the thoroughness with which certain foods are cooked by either of the methods discussed above.

The principal object of the present invention is to provide means by which the heat supply period can be controlled to give a predetermined oven temperature in a predetermined time. This is accomplished by designing the burners to provide sufficient heat on a relatively low fuel pressure and then passing the fuel through a pressure regulator which operates to reduce the fuel pressure to the said low pressure and maintains said pressure irrespective of the actual pressure of fuel supply. Thus, for a given setting of the burner gas valve and a given setting of the pressure regulator, there will always be supplied to the burner a uniform amount of gas per unit of time. Since the heating value of the gas is usually practically constant and the combustion efficiency of a given burner varies but slightly, this results in a uniform rate of heat supply to the oven. The oven is preferably surrounded by heat insulating walls so that the rate of heating is substantially independent of radiation and the outside temperature. The uniform rate of heat supply, therefore, insures that the oven will reach a predetermined temperature in a predetermined time. When this temperature has been reached, the heat supply is shut off and the vent is closed by either the thermostatic method or the time-controlled method. Since there is a definite relation between the temperature and the time required to reach that temperature, either method may be used. However, the thermostatic method is preferred and is illustrated herein.

Other features of the invention reside in the specific form of mechanism used for shutting off the fuel and air supply.

Other objects and features of the invention will be understood from the accompanying drawings and the following description and claims:

Fig. 1 is a plan view of an oven having a preferred form of control mechanism connected thereto. Fig. 2 is an elevational view of the same in section. Fig. 3 is a detail in elevation showing the control handles for operating the control devices. Fig. 4 is an enlarged portion of Fig. 1 showing certain parts of the control apparatus in more detail. Fig. 5 is a central sectional view in elevation of the parts shown in Fig. 4 and other parts associated therewith. Fig. 6 and Fig. 7 are sectional views in elevation taken on the lines 6—6 and 7—7 of Fig. 5, respectively. Fig. 8 is a detailed view with parts removed of a particular form of thermostat which may be used with the invention.

The oven shown in the drawings consists of an outer shell 10 and an inner shell 11 having a filling of heat insulating material 12 therebetween and fitted with an oven door 13. In the lower part of the oven chamber there is located a burner 14 supplied with fuel through a pipe 15 leading from a valve 16. Fuel is supplied to the valve 16 by a pipe 17 leading from a pressure regulator 18 in turn supplied by a pipe 19 connected to any suitable fuel supply. The pressure regulator 18 is of a common form adapted to reduce the pressure of the fuel to a relatively low pressure and to admit only so much fuel to pipe 17 as is necessary to maintain this pressure. Thus the valve 16 always receives fuel at a uniform pressure so that, with a given setting of valve 16, a uniform amount of fuel per unit of time is delivered to the burner 14. The burner, therefore, heats the oven to a predetermined degree in a predetermined length of time, as previously described.

The apparatus for automatic control of the oven vent and fuel valve is principally supported upon a pair of castings 20 and 21 carried upon the shell of the oven as best seen in Fig. 2. The casting 20 has formed therein a horizontal partition 22 having openings 23 and 24. The opening 24 is closed by a cover 25 and the opening 23 is closed by a movable closure 26. When the closure 26 is raised, the products of combustion from the oven follow the path indicated by the three arrows in Fig. 2, passing from the oven through the opening 23 and out through a vent opening 27 to any suitable chimney or similar disposal device. When the closure 26 is lowered, no circulation of gases from the oven is possible and the oven, therefore, operates as a fireless cooker.

The valve 16 is supported upon the casting 21 by means of a stud 28. The said valve is of the plug-cock type having a valve plug 29 to the stem 30 of which there is fastened a radially extending pin 31 which rests upon the top of a stud 32 when the valve is closed, but which moves upwardly, away from the stud when the valve is opened. The valve stem 30 also has attached thereto a rod 33 extending to the front of the stove and carrying at that end a pointer or handle 34. The said pointer may be rotated to open and close the valve 16 and registers with a scale on the front plate 35 of the stove to indicate the setting of the valve. The said scale is represented in Fig. 3 by the legend "Off—¼—½—¾—On".

The casting 21 supports a pair of bearing brackets 36 and 37 in the latter of which there is clamped a bushing 38. A tube 39 is rotatably supported in the bearing bracket 36 and the bushing 38 and surrounds the rod 33 throughout the greater part of the length of said rod. A similar tube 40 surrounds the remainder of the rod 33 and is fastened to the tube 39 by a semiflexible coupling 41. The outer end of tube 40 has fastened thereto a bushing 42 which is freely rotatable in a bearing 43 carried on the front plate 35. A dial 44 is carried by said bushing and is marked with graduations visible through an opening 45 in the plate 35. The bushing 42 also carries outside of the plate 35 a knob 46 by means of which the tubes 39 and 40 and their associated parts may be rotated.

The tube 39 has fastened thereto near the valve 16 a cam 47 carrying a pin 48 positioned to engage the pin 31. If the valve 16 is opened, therefore, it may be closed by a counter-clockwise rotation of the cam 47 and it may not again be opened until said cam has been moved in a clockwise direction. After the latter movement, the pointer 34 may be turned to adjust the valve 16 as desired.

The tube 39 also carries a cam 49 having an outer surface shaped as best shown in Fig. 7. A roller 50 is carried upon the upper end of a slide bar 51 and engages the said surface of the cam. The slide bar is provided with a guide slot 52 through which the tube 39 passes and which serves to confine the movements of the bar to a vertical path. The lower end of the bar 51 is bent at a right angle and is fastened to the upper end of a stem 53, the lower end of which is in turn fastened to the vent closure 26. As will be seen from Fig. 7, the shape of cam 49 is such that a partial revolution of the cam in a clockwise direction raises the closure 26 to open the vent while a return to the normal position shown in that figure results in closing of the vent.

The tube 39 also carries a collar 54 fastened thereto, which serves as an abutment for one end of a torsion spring 55, the other end of which is fastened to the bushing 38. The spring serves to urge the tubes 39 and 40 in the counter-clockwise direction toward the position indicated in Fig. 7. In that position the pin 31 rests on stud 32 and pin 48 rests on pin 31 so that no further movement of the tubes by the spring is possible.

A thermostatic unit is provided. The said unit includes an inverted U-shaped frame 56 supported from the casting 21 by means of bolts 57. The said frame is positioned in the vent passage of the oven beneath the opening 24, the cover 25 of which is removable for insertion of said frame. Between the legs of the U-shaped frame 56 there is positioned a number of thermostatic leaves 58 placed one above the other in parallel, spaced relation and each having each end bent about a pin 59. The pins 59 extend at both ends through openings 60 in the frame 56. The leaves 58 are made in the usual manner of two metals having dissimilar expansion properties so arranged as to bow downwardly when heated. A trip rod 61 extends vertically through suitable openings in the leaves 58 and is provided with a toothed upper end 62 engaging teeth 63 formed in the periphery of the cam 47. The said trip rod is upwardly pressed by a spring 64 contained in a cup-shaped depression 65 in the casting 21 and abutting against a cotter pin 66 passing through said rod. The teeth are so shaped that the trip rod prevents turning of the cam 47 by the spring 55 but does not prevent movement thereof in the opposite direction by hand. The lower end of the trip rod carries an adjustable nut 67 positioned to be engaged by the lowermost of the leaves 58 as the said leaf is heated and bends downwardly. Spacer bushings 68 surround the trip 61 between the leaves 58 and each bushing serves to transmit the bending force of the leaf above to the leaf below. In this manner, the force received by the nut 67 and rod 61 is the total of the bending force of the several leaves. When the leaves have bent sufficiently to press the trip rod 61 downwardly out of engagement with the teeth 63, the spring 55 is free to move the cams to close valve 16 and the vent closure 26.

From Figure 7, it will be seen that the periphery of the cam 47 is of a generally spiral form so that the trip rod 61 is forced downwardly as the cam is rotated in a clockwise direction. The nut 67 on the lower end of the trip rod is thus moved farther from engagement with the lowermost leaf 58. The leaves then must be heated to a higher temperature before they reach the nut 67 and press the trip rod downward. Thus the rotated position of the cam 47 determines the temperature at which the trip rod is operated. The cam position for various temperatures is indicated by numerals on the dial 44 visible through the opening 45 in the front plate of the stove.

The operation of the apparatus will now be described. Assuming that it is desired to cook a certain food which is known to require a heat supply period of 20 minutes and a maximum temperature of 500° at the end of this period. Assume also that it has been found that this temperature will be reached in 20 minutes with the normal setting of the pressure regulator and with the gas valve ¾ open. The knob 46 is first turned to bring the numeral 500° into view through the opening 45, thus indicating that the trip rod 61 has been moved downward to a point at which 500° is required for it to be tripped by the thermostatic leaves 58. It will be noted that there are no teeth on the first 90° of the cam 47 and that this portion of the cam has the form of an arc of a circle. No adjustment of the trip rod 61, therefore, takes place during the first quarter revolution of the cam. It will also be seen that the entire movement of opening the vent closure 26 takes place during the first quarter revolution of the cam 49. The pin 48 moves sufficiently during this quarter revolution to permit the gas valve to be fully opened if necessary. Thus the first quarter revolution of the knob 46 fully opens the vent, and arranges the parts so that the gas valve may be fully opened. Further movement of the knob adjusts the trip rod 61 for the desired final temperature.

After the knob 46 has been set, the pointer 34 is moved to the ¾ mark to open the gas valve the desired amount. The gas may then be lit. Since a constant flow of gas at a measured rate is delivered, it is certain that the oven will then reach the desired 500° temperature in the desired 20 minutes of time.

The invention claimed is:

1. In a cook stove, the combination of an oven, a burner for heating said oven, a valve for controlling the supply of fuel to said burner, a spiral cam having teeth formed about its periphery, a spring tending to rotate said cam in one direction, a trip member having teeth engageable with the teeth of said cam and normally preventing rotation of said cam by said spring but permitting manual rotation thereof, a thermostatic element adapted to move when heated and engageable with said trip member to move the same out of engagement with said cam to permit rotation of said cam by said spring, and connecting means between said cam and valve for closing said valve when said cam is so rotated, the form of said cam being such that the manual rotation thereof moves the trip member to vary its position with respect to said thermostatic element for varying the temperature to which the latter must be heated before engaging said trip member.

2. In a cook stove, the combination of an oven structure having an air vent, a closure for said vent, a burner for heating said oven, a valve for controlling the supply of fuel to said burner, a spiral cam having teeth formed about its periphery, a spring tending to rotate said cam in one direction, a trip member having teeth engageable with the teeth of said cam and normally preventing rotation of said cam by said spring but permitting manual rotation thereof, a thermostatic element adapted to move when heated and engageable with said trip member to move the same out of engagement with said cam to permit rotation of said cam by said spring, and connecting means between said cam, said valve and said vent closure for closing both said valve and vent closure when said cam is so rotated, the form of said cam being such that the manual rotation thereof moves the trip member to vary its position with respect to said thermostatic element for varying the temperature to which the latter must be heated before engaging said trip member.

3. In a cook stove, the combination of an oven, a burner for heating the same, a supply pipe for supplying fuel to said burner, a valve in said supply pipe for controlling the flow of fuel therethrough, a heat-responsive device in said oven, mechanism connecting said heat-responsive device and said valve and operable to close said valve when the temperature within the oven has reached a predetermined maximum, and a pressure regulator in said supply pipe located at a position to control the pressure at said valve exclusively in such manner as to insure an approximately uniform predetermined fuel pressure at said burner, whereby an approximately uniform amount of heat per unit of time is supplied to said oven for a given setting of said valve and said pressure regulator.

4. In a cook stove, the combination of an oven having a vent opening, a closure for said vent opening, a burner for heating the oven, a supply pipe for supplying fuel to said burner, a valve in said supply pipe for controlling the flow of fuel therethrough, a heat-responsive device in said oven, mechanism connecting said heat-responsive device with said valve and said vent closure operable to close the valve and the vent when the temperature within said oven has reached a predetermined maximum, and a pressure regulator in said supply pipe located at a position to control the pressure at said valve exclusively in such manner as to insure an approximately uniform predetermined fuel pressure at said burner, whereby an approximately uniform amount of heat per unit of time is supplied to said oven for a given setting of said valve and said pressure regulator.

ALDEN P. CHESTER.
DEWEY H. HILL.